US011580763B2

(12) United States Patent
Ammar et al.

(10) Patent No.: US 11,580,763 B2
(45) Date of Patent: Feb. 14, 2023

(54) REPRESENTATIVE DOCUMENT HIERARCHY GENERATION

(71) Applicant: Thomson Reuters Enterprise Centre GmbH, Zug (CH)

(72) Inventors: Khaled Ammar, Waterloo (CA); Brian Zubert, Waterloo (CA); Sakif Hossain Khan, Montreal (CA)

(73) Assignee: Thomson Reuters Enterprise Centre GmbH, Zug (CH)

( * ) Notice: Subject to any disclaimer, the term of this patent is extended or adjusted under 35 U.S.C. 154(b) by 277 days.

(21) Appl. No.: 16/876,617

(22) Filed: May 18, 2020

(65) Prior Publication Data

US 2020/0364451 A1 Nov. 19, 2020

Related U.S. Application Data

(60) Provisional application No. 62/849,181, filed on May 17, 2019.

(51) Int. Cl.
| | |
|---|---|
| *G06V 30/414* | (2022.01) |
| *G06K 9/62* | (2022.01) |
| *G06V 10/75* | (2022.01) |
| *G06V 30/416* | (2022.01) |

(52) U.S. Cl.
CPC ......... *G06V 30/414* (2022.01); *G06K 9/6256* (2013.01); *G06V 10/751* (2022.01); *G06V 30/416* (2022.01)

(58) Field of Classification Search
CPC ...... G06V 30/414; G06V 30/416; G06N 3/08; G06Q 50/184
See application file for complete search history.

(56) References Cited

U.S. PATENT DOCUMENTS

| | | | | |
|---|---|---|---|---|
| 9,659,224 | B1 * | 5/2017 | Cole | .............. G06V 30/224 |
| 2019/0258854 | A1 † | 8/2019 | Hosabettu | |

OTHER PUBLICATIONS

International Search Report and Written Opinion issued for PCT Application No. PCT/IB2020/054695, dated Sep. 7, 2020, 12 pages.

(Continued)

*Primary Examiner* — Daniel G Mariam
(74) *Attorney, Agent, or Firm* — Norton Rose Fulbright US LLP

(57) ABSTRACT

In some aspects, a method includes performing optical character recognition (OCR) based on data corresponding to a document to generate text data, detecting one or more bounded regions from the data based on a predetermined boundary rule set, and matching one or more portions of the text data to the one or more bounded regions to generate matched text data. Each bounded region of the one or more bounded regions encloses a corresponding block of text. The method also includes extracting features from the matched text data to generate a plurality of feature vectors and providing the plurality of feature vectors to a trained machine-learning classifier to generate one or more labels associated with the one or more bounded regions. The method further includes outputting metadata indicating a hierarchical layout associated with the document based on the one or more labels and the matched text data.

20 Claims, 5 Drawing Sheets

(56) References Cited

OTHER PUBLICATIONS

Lu et al. "A Metadata Generation System for Scanned Scientific Volumes," JCDL '08: Proceedings of the 8th ACM/IEEE-CS Joint Conference on Digital Libraries, Jun. 2008, 10 pages.
Rahman et al. "Understanding the Logical and Semantic Structure of Large Documents," SDM 2016 Doctoral Forum, SIAM international Conference on Data Mining, Apr. 2017, 10 pages.
Bloechle et al. "XCDF: A Canonical and Structured Document Format," Annual International Conference on the Theory and Applications of Cryptographic Techniques, Eurocrypt 2018, Lecture Notes in Computer Science, vol. 3872. Springer, Feb. 2006, 12 pages.
Taghva et al. "Automatic Error Correction and Query Evaluation of OCR Generated Text," Online Information 1989: Proceedings of the 13th International Online Information Meeting, Dec. 1993; 14 pages.
Ramakrishnan, Cartic & Patnia, Abhishek & Hovy, Eduard & Burns, Gully. (2012). Layout-aware text extraction from full-text PDF of scientific articles. Source code for biology and medicine. 7:7 pp. 1-10.†
Keysers, Daniel & Shafait, Faisal & Breuel, Thomas. (2007). Document image zone classification : A simple high-performance approach. 44-51.†
K. Jain and Bin Yu, "Document representation and its application to page decomposition," in IEEE Transactions on Pattern Analysis and Machine Intelligence, vol. 20, No. 3, pp. 294-308, Mar. 1998.†
Zulfiqar, A. Ul-Hasan and F. Shafait, "Logical Layout Analysis using Deep Learning," 2019 Digital Image Computing: Techniques and Applications (DICTA), 2019, pp. 1-5.†
G. Nagy, "Twenty years of document image analysis in PAMI," in IEEE Transactions on Pattern Analysis and Machine Intelligence, vol. 22, No. 1, pp. 38-62, Jan. 2000.†
Breuel, T., "The OCRopus Open Source OCR System", Electronic Imaging (2008).†
Shafait, F., "Geometric Layout Analysis of Scanned Documents", Dissertation, Doctorate of Engineering, Technical University of Kaiserslautern (Apr. 22, 2018).†

\* cited by examiner
† cited by third party

300

This agreement is dated

PARTIES

(1) London Borough of Barnet of North London Bus London N11 1NP, United Kingdom (Authority).
(2) OCS Group UK Limited incorporated and regis company number 3056469 whose registered of Park, Brighton Road, Crawley, RG11 9BP, Unite

BACKGROUND

(A) The Authority sought proposals for the provis management of its CCTV service by means of contract will involve the installation and main recording and monitoring system, staffing, and monitoring CCTV and maintenance/upgrade ar The Authority placed a contract notice, Refere May 2013 in the Official Journal of the Europe interest from potential providers for the provis management of its CCTV service.
(B) The Authority has, through a competitive proce to provide these services and the Service Prov the services in accordance with the terms and c

AGREED TERMS

1. DEFINITIONS AND INTERPRETATION

1.1 The definitions and rules of interpretation in this Achieved Service Levels: in respect of an period, the standard of performance actually ac the provision of the Services in the measureme and expressed in the same way as the Ser calculated and expressed in 0.
Arquiva Contract: the services concession co

---

310

This agreement is dated — Paragraph

| PARTIES | Section |

(1) London Borough of Barnet of North London Bus London N11 1NP, United Kingdom (Authority).
(2) OCS Group UK Limited incorporated and regis company number 3056469 whose registered of Park, Brighton Road, Crawley, RG11 9BP, Unite — Paragraph

| BACKGROUND | Section |

(A) The Authority sought proposals for the provis management of its CCTV service by means of contract will involve the installation and main recording and monitoring system, staffing, and monitoring CCTV and maintenance/upgrade ar The Authority placed a contract notice, Refere May 2013 in the Official Journal of the Europe interest from potential providers for the provis management of its CCTV service.
(B) The Authority has, through a competitive proce to provide these services and the Service Prov the services in accordance with the terms and c — Paragraph

| AGREED TERMS | Section |

| 1. | DEFINITIONS AND INTERPRETATION | Sub-Section |

1.1 The definitions and rules of interpretation in this Achieved Service Levels: in respect of an period, the standard of performance actually ac the provision of the Services in the measureme and expressed in the same way as the Ser calculated and expressed in 0.
Arquiva Contract: the services concession co — Paragraph

*FIG. 3*

REPRESENTATIVE DOCUMENT HIERARCHY GENERATION

CROSS-REFERENCE TO RELATED APPLICATION

The present application claims priority to U.S. Provisional Application No. 62/849,181, filed May 17, 2019, and entitled, "REPRESENTATIVE DOCUMENT HIERARCHY GENERATION," the disclosure of which is incorporated by reference herein in its entirety.

TECHNICAL FIELD

The present subject matter is directed generally to hierarchical layout generation from textual data of a document.

BACKGROUND

As digital content has evolved, many document enhancement features have been added to digital documents. One such example is a linked table-of-contents. For example, some digitally-created documents may include a table-of-contents where each chapter, or other level of a document hierarchy, is linked to a respective portion of the digital document. The linked table-of-contents is typically generated based on metadata that indicates which level of a document hierarchy each portion of the document belongs to. The metadata may be generated by an application used to create the digital document. These linked table-of-contents may enable advanced document analysis, as well as increase user-friendliness of the digital documents. However, such creation of digital documents with linked table-of-contents may be time consuming and user input intensive.

Despite the recent evolution of digital content, many documents are still required to be available as in-print publications. Some examples of documents that are required to be available as in-print publications include governance and legal documents. To convert these in-print documents to digital documents, the in-print documents are scanned by a computer to generate text data. However, this text data does not include metadata that indicates document hierarchies of the scanned documents. For this reason, the scanned documents do not include linked table-of-contents.

SUMMARY

The present disclosure provides systems, methods, and computer-readable media for extracting a document hierarchy from a digital document, particularly from digital documents that do not already have metadata indicating a predefined document structure. For example, the digital document may be a portable document format (pdf) file generated by scanning a print document, and the document hierarchy may be a table-of-contents or other document structure. To illustrate, the systems and methods described herein may perform optical character recognition (OCR) on a digital document to generate text data. The systems and methods described herein may also detected bounded regions in the digital document that each include a block of text. For example, the bounded regions may be detected based on a predetermined boundary rule set, such as rules that indicate distances between pixels of text, distances between pixels of different regions, indentations of text, shapes of regions, and/or other rules, as further described herein. After generating the text data and detecting the bounded regions, the systems and methods described herein may match the text data to the bounded regions to generate matched data that indicates associations between portions of the text data (e.g., blocks of text) and the bounded regions. Optional text correction may be performed to further refine the text of the matched data, and features may be extracted from the matched data to generate feature vectors.

The feature vectors are provided to a trained machine learning (ML) classifier that is trained to generate labels associated with each combination of text block and bounded region. The labels may indicate a level of the corresponding text block and bounded region within a document hierarchy of the digital document. The systems and methods may also output metadata indicating a hierarchical layout of the digital document based on the labels and the matched data. For example, the metadata may indicate the level in the hierarchical layout of each text block in the digital document, relationships between the various levels, indexed terms, other information, or a combination thereof. The metadata may be used to output the hierarchical layout, such as a table-of-contents, of the digital document. Additionally, or alternatively, the metadata may enable enhanced document features, such as identification of one or more fields in the digital document, linking the digital document to other digital documents based on the one or more fields, or other features. Thus, the techniques described herein enable determination of a hierarchical layout of a digital document, such as a pdf file of a scanned print document or another format of digital document, that does not include metadata that indicates a predefined structure of the digital document. The determination of the hierarchical layout is performed automatically by the system, thereby reducing (or eliminating) user-input in the process.

In one particular aspect, a method for determining hierarchical layouts of documents from data includes performing optical character recognition (OCR) based on data corresponding to a document to generate text data. The method includes detecting one or more bounded regions from the data based on a predetermined boundary rule set. Each bounded region of the one or more bounded regions encloses a corresponding block of text. The method also includes matching one or more portions of the text data to the one or more bounded regions to generate matched text data. The matched text data indicates, for each block of text represented by the matched text data, an association with a corresponding bounded region of the one or more bounded regions. The method includes extracting features from the matched text data to generate a plurality of feature vectors. The method also includes providing the plurality of feature vectors to a trained machine-learning classifier to generate one or more labels associated with the one or more bounded regions. Each label of the one or more labels indicates a level of a corresponding bounded region within a document hierarchy. The method further includes outputting metadata indicating a hierarchical layout associated with the document based on the one or more labels and the matched text data.

In another aspect, a system may be provided. The system includes an optical character recognition (OCR) engine configured to perform OCR based on data corresponding to a document to generate text data. The system includes a bounded region detector configured to detect one or more bounded regions from the data based on a predetermined boundary rule set. Each bounded region of the one or more bounded regions encloses a corresponding block of text. The system also includes a text matcher configured to match one or more portions of the text data to the one or more bounded regions to generate matched text data. The matched text data indicates, for each block of text represented by the matched text data, an association with a corresponding bounded region of the one or more bounded regions. The system includes a feature extractor configured to extracting features from the matched text data to generate a plurality of feature vectors. The system also includes a trained machine-learning classifier configured to generate one or more labels associated with the one or more bounded regions based on the plurality of feature vectors. Each label of the one or more labels indicates a level of a corresponding bounded region within a document hierarchy. The system further includes an output generator configured to output metadata indicating a hierarchical layout associated with the document based on the one or more labels and the matched text data.

In yet another aspect, a computer-based tool may be provided. The computer-based tool may include non-transitory computer readable media having stored thereon computer code which, when executed by a processor, causes a computing device to perform operations that include performing optical character recognition (OCR) based on data corresponding to a document to generate text data. The operations include detecting one or more bounded regions from the data based on a predetermined boundary rule set. Each bounded region of the one or more bounded regions encloses a corresponding block of text. The operations also include matching one or more portions of the text data to the one or more bounded regions to generate matched text data. The matched text data indicates, for each block of text represented by the matched text data, an association with a corresponding bounded region of the one or more bounded regions. The operations include extracting features from the matched text data to generate a plurality of feature vectors. The operations also include providing the plurality of feature vectors to a trained machine-learning classifier to generate one or more labels associated with the one or more bounded regions. Each label of the one or more labels indicates a level of a corresponding bounded region within a document hierarchy. The operations further include outputting metadata indicating a hierarchical layout associated with the document based on the one or more labels and the matched text data.

The foregoing broadly outlines the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 3 illustrates an example of a document and a hierarchical layout corresponding to the document determined in accordance with aspects of the present disclosure;

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
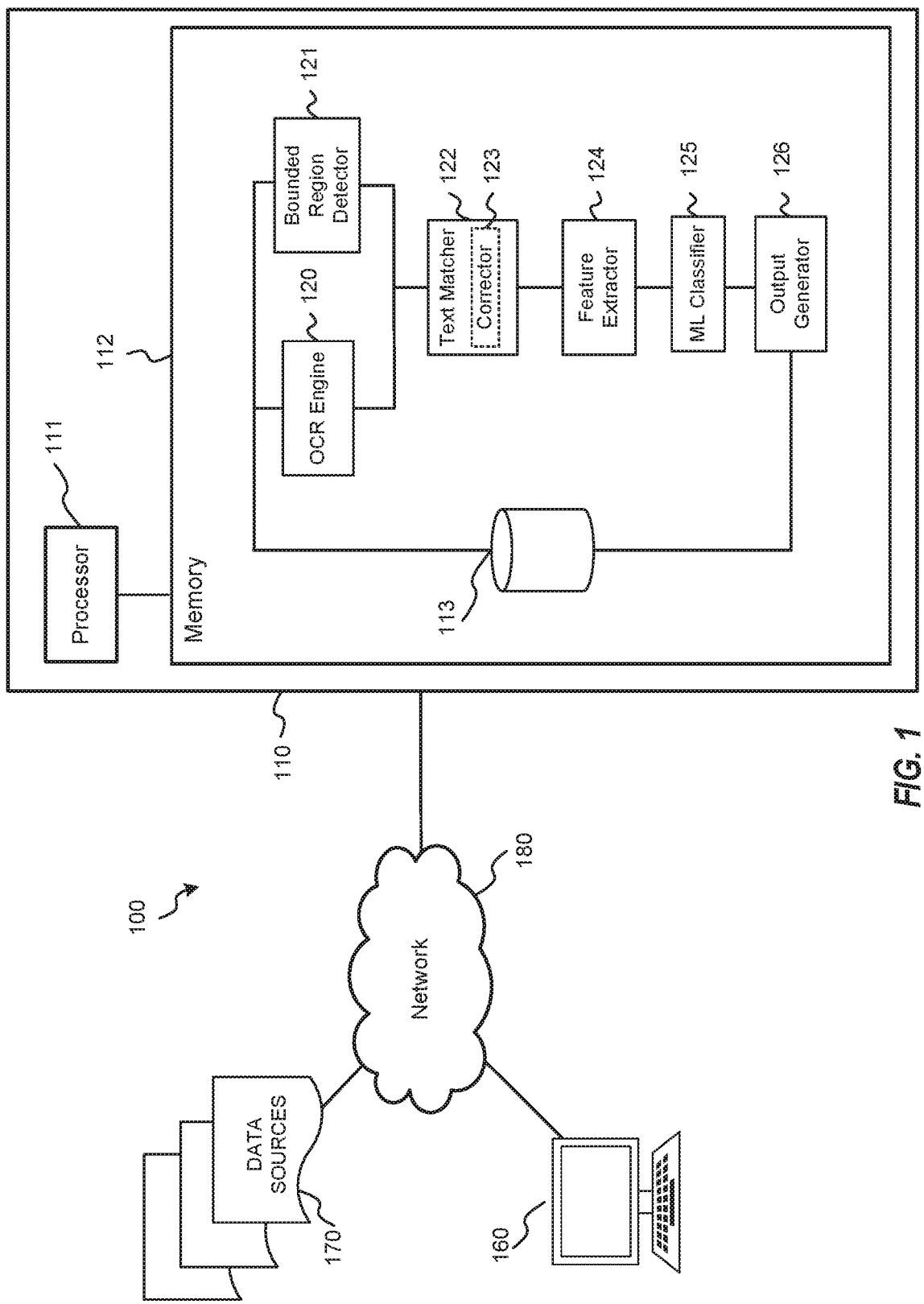
FIG. 1 shows a system configured to determine a hierarchical layout associated with a document in accordance with aspects of the present disclosure.

FIG. 1 is a block diagram of an exemplary system 100 configured with capabilities and functionality for determining a hierarchical layout associated with a document. As shown in FIG. 1, system 100 includes server 110, at least one user terminal 160, at least one data source 170, and network 180. These components, and their individual components, may cooperatively operate to provide functionality in accordance with the discussion herein. For example, in operation according to one or more implementations, data (e.g., textual data or documents) may be obtained from data sources 170 and may be provided as input to server 110. The various components of server 110 may cooperatively operate to perform hierarchical layout generation from the data. For example, the various components of server 110 may cooperatively operate to generate text data from a document (e.g., by performing optical character recognition (OCR)) and to detect one or more bounded regions in the document based on a predetermined boundary rule set. The various components of server 110 may also match one or more portions of the text data to the bounded regions to generate matched data that indicates, for each block of text represented by the matched data, an association with a corresponding bounded region. Features may be extracted from the matched data to generated feature vectors, and the feature vectors may be provided to a trained machine learning (ML) classifier that is configured to generate labels associated with the bounded regions (and the associated text blocks). The labels indicate levels of corresponding bounded regions (and associated text blocks) within a document hierarchy. After the labels are generated by the trained ML classifier, the components of server 110 may output metadata indicating a hierarchical layout associated with the document based on the labels and the matched data. In some implementations, the metadata is used to output the hierarchical layout, such as a table-of-contents or other document structure, of the document. Additionally, or alternatively, the metadata may be used to enable one or more enhanced document features, such as field identification, document linking, or other features. As such, various aspects of the present disclosure allow hierarchical layout generation from a digital document that does not include metadata indicating a predefined document structure, as further described herein.

It is noted that the functional blocks, and components thereof, of system 100 of implementations of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

In some aspects, server 110, user terminal 160, and data sources 170 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between user terminal 160 and server 110.

User terminal 160 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 160 may be configured to provide a graphical user interface (GUI) via which a user may be provided with information related to data and information received from server 110. For example, user terminal 160 may receive results of hierarchical layout generation from server 110. The results may include a table of contents or other type of hierarchical layout, as illustrative, non-limiting examples. A user may review the results and provide an analysis or feedback regarding the results. The analysis or feedback may be provided to server 110 from user terminal 160 as an input.

Data sources 170 may comprise at least one source of textual data. For example, the data source(s) may include a legal documents data source, a contracts data source, a governance data source, a streaming data source, news data, a database, a social media feed, a data room, another data source, the like, or a combination thereof. In a particular implementation, the data from data source 170 may include or correspond to one or more parties. The one or more parties may include an individual, a group of individuals, a company, a government, an agency, an organization, the like, or a combination thereof, as illustrative, non-limiting examples.

Server 110 may be configured to receive data from data sources 170, to apply customized text processing algorithms, machine learning algorithms, and/or other processing to generate metadata indicating hierarchical layouts of documents. In some implementations, the hierarchical layouts may be based on labels of various levels of the hierarchical layouts, as further described herein. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some implementations, server 110 may be implemented, wholly or in part, on an on-site system, or on a cloud-based system.

As shown in FIG. 1, server 110 includes processor 111, memory 112, database 113, optical character recognition (OCR) engine 120, bounded region detector 121, text matcher 122, optional corrector 123, feature extractor 124, machine learning (ML) classifier 125, and output generator 126. It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 111, cause processor 111 to perform operations in accordance with the present disclosure. In aspects, memory 112 may also be configured to facilitate storage operations. For example, memory 112 may comprise database 113 for storing detected text, one or more feature vectors, one or more labels, metadata indicating one or more hierarchical layouts, training data, processed document data, one or more predetermined boundary rule sets, input (e.g., from user terminal 160), other information, etc., which system 100 may use to provide the features discussed herein. Database 113 may be integrated into memory 112, or may be provided as a separate module. In some aspects, database 113 may be a single database, or may be a distributed database implemented over a plurality of database modules. In some embodiments, database 113 may be provided as a module external to server 110. Additionally, or alternatively, server 110 may include an interface configured to enable communication with data source 170, user terminal 160 (e.g., an electronic device), or a combination thereof.

OCR engine 120 may be configured to perform OCR based on data corresponding to a document to generate text data. The data corresponding to the document may be image data, such as a portable document format (pdf) file or other file format. The data may be generated by scanning a print document using a scanner, a camera, or another image capturing means, or the document may be electronically created (e.g., such as by a user operating a document creation and/or management application). Regardless of how the data is created, the data does not include metadata, or any other type of information, indicating a predefined structure of the document.

Performing OCR on the data may generate the text data. The OCR process may extract the text data from the document by recognizing characters, words, sentences, punctuation marks, or a combination thereof, in the image data of the document. In some implementations, OCR engine 120 may include one or more neural networks, or other machine learning (ML) models or algorithms, configured to perform the OCR. In some implementations, OCR engine 120 may be configured to perform preprocessing on the image data of the document, such as de-skewing, binarisation, line removal, scale and aspect ratio normalization, other preprocessing operations, or a combination thereof. Additionally, or alternatively, OCR engine 120 may be configured to perform post-processing to improve (e.g., "optimize") the generated text data. For example, OCR engine 120 may be configured to compare the text data to a predefined lexicon, to perform nearest-neighbor analysis on words within the text data, to use the Levenshtein Distance algorithm, other post-processing operations, or a combination thereof, as non-limiting examples. In some implementations, OCR engine 120 may be configured to recognize and maintain text formatting. In some other implementations, OCR engine 120 does not recognize or maintain text formatting.

Bounded region detector 121 may be configured to detect one or more bounded regions from the data of the document (e.g., the image data) based on a predetermined boundary rule set. Each bounded region encloses a corresponding block of text. For example, the document may be decomposed into multiple bounded regions each including a respective text block. As used herein, a text block may include any amount of text, such as a word, a few words, a sentence, a paragraph, multiple paragraphs, other groupings of text, or a combination thereof. The bounded regions may have various shapes and sizes. In some implementations, the bounded regions are defined by bounding boxes having a rectangular shape. In some other implementations, the bounded regions may be defined by other shapes, such as squares, circles, ellipses, polygons, or other shapes.

Bounded regions may be detected using image processing and/or computer vision techniques. The image processing techniques may be similar to those used to detect objects or faces in images or video, except applied to blocks of text in an image. For example, bounded region detector 121 may be configured to identify one or more colors of pixels that indicate text, as compared to white space (or other colors) between text, and the identified colors may be used to detect text. Different bounded regions may be detected based on an amount of vertical (or horizontal) distance between text, a location of text within a page of the document, other characteristics, or a combination thereof, as non-limiting examples. For example, a first bounded region may be detected surrounding a first block of text that begins at a first x-coordinate, and a second bounded region may be detected surrounding a second block of text that begins at a second x-coordinate that is larger than the first x-coordinate (e.g., text may be separated into different bounded regions based on indentation of the text). As another example, a first bounded region may be detected surrounding a first sentence and a second bounded region may be detected surrounding a second group of sentences based on a vertical distance between the first sentence and the group of second sentences satisfying (e.g., being greater than or equal to) a threshold. As yet another example, different bounded regions may be detected surrounding text blocks having different formats, such as bold, italicized, text size, or another format type, as non-limiting examples.

The bounded regions may be indicated by a set of coordinates corresponding to a physical page, or pages, of the document. For example, the sets of coordinates may include x-coordinates and y-coordinates corresponding to pixels (or other locations) within the page(s) of the document. In implementations in which the bounded regions are defined by bounding boxes, the bounded regions may be indicated by coordinates of an upper-left corner and coordinates of a lower-right of the corresponding bounding box. In some other implementations, the sets of coordinates may include coordinates of a center, coordinates of ends of a radius, coordinates of ends of a diameter, coordinates of one or more vertices, other coordinates, or a combination thereof, as non-limiting examples.

Bounding region detector 121 may be configured to detect the bounded regions based on the predefined boundary rule set. The predefined boundary rule set may indicate one or more rules applied by bounding region detector 121 to detect the presence of bounded region in images of the document. For example, the predetermined boundary rule set may include one or more rules that are stored at (or accessible to) server 110 and that indicate constraints for detecting bounded regions. In some implementations, the predetermined boundary rule set includes pixel distance rules, pixel location rules, pixel characteristic rules, region shape rules, other rules, or a combination thereof. To illustrate, the pixel distance rules may include a rule indicating that a first line of text and a second line of text are to be included in the same bounded region if a distance (e.g., a vertical distance) between a bottom-most pixel of the first line of text and an upper-most pixel of the second line of text is less than a first threshold, and a rule indicating that the first line of text and the second line of text are to be included in different bounded regions if the distance satisfies (e.g., is greater than or equal to) a second threshold. Similar rules may be included for horizontal distances between pixels. The pixel location rules may include a rule indicating that a first text block is to be included in a different bounded region than a second text block based on a distance between a left-most pixel of the first text block and a left-most pixel of the second text block satisfying a threshold, or a rule indicating that the first text block is to be included in a different bounded region than the second text block based on a location of the left-most pixel of the first text block being within a first range and a location of the left-most pixel of the second text block being within a second range. The pixel characteristic rules may include a rule indicating that a first line of text and a second line of text are to be included in the same bounded region based on a similarity of a pixel characteristic of the first line of text, such as a color, an intensity, a resolution, or another characteristic, to a pixel characteristic of the second line of text satisfies a threshold. The region shape rules may include a rule indicating that one or more shapes, such as rectangles and squares, are acceptable for bounded regions, or a rule indicating that one or more other shapes, such as ellipses or circles, are not acceptable for bounded regions. Although particular examples of boundary rules are described herein, the present disclosure is not so limited, and the predetermined boundary rule set may include any rule that enables boundary region detection using image processing and/or computer vision that would otherwise not be possible without metadata indicating bounded regions, user-input indicating bounded regions, or more resource-intensive computer vision techniques.

In some implementations, OCR engine 120 and bounded region detector 121 may be configured to operate at least partially concurrently. For example, some or all of the operations performed by OCR engine 120 may occur during a same time period as some or all of the operations performed by bounded region detector 121. To further illustrate, as shown in FIG. 1, OCR engine 120 and bounded region detector 121 may be coupled in parallel. In some other implementations, OCR engine 120 and bounded region detector 121 may perform operations serially. For example, bounded region detector 121 may be configured to operate after generation of the text data by OCR engine 120, or OCR engine 120 may be configured to operate after detection of bounded regions by bounded region detector 121.

Text matcher 122 may be configured to match one or more portions of the text data from OCR engine 120 to one or more bounded regions detected by bounded region detector 121 to generate matched text data. The matched text data may indicate, for each block of text indicated by the matched text data, an association with a corresponding bounded region of the one or more bounded regions. For example, text matcher 122 may identify "noisy" text located with each bounded region and may match the noisy text (e.g., text from the image data that has not been OCRed) to a closest string or sub-string of text from the text data (e.g., the OCRed text). In this manner, each bounded region may be associated with a text string (representing a text block) from the text data. Because the text data is more accurate than the noisy text, more accurate matching of text strings (e.g., blocks of text) to bounded regions may occur than if only the noisy text was used.

In some implementations, text matcher 122 may be configured to compare the noisy text from a bounded region to each possible text string (or sub-string) of the text data to generate similarity scores, and the text string with the highest similarity score is selected as the matching text string. In some other implementations, text matcher 122 may be configured to compare the noisy text from a bounded region to text strings of the text data, but the process may be stopped, and a match identified, when a similarity score satisfies a threshold. Such a process may be quicker and use less processing resources than comparing each grouping of noisy text to every possible text string. In some other implementations, text matcher 122 may match the text data to the bounded regions using location data. For example, processor 111 may divide the text data into multiple sub-strings and may extract location data (e.g., sets of coordinates) associated with the sub-strings subsequent to, or concurrently with, operation of OCR engine 120. Text matcher 122 may match strings of the text data to the bounded regions by matching the location data associated with the text strings to location data (e.g., sets of coordinates) associated with the bounded regions.

Text matcher 122 may optionally include corrector 123 (also referred to herein as text corrector 123). Text corrector 123 may be configured to perform text correction on the matched text data. In some implementations, text correction includes semantic matching, longest common sub-string detection, other correction operations, or a combination thereof, as non-limiting examples. For example, text corrector 123 may be configured to perform semantic matching to match words from noisy text to words from the text data, or to replace one or more potentially incorrectly extracted words in the text data, using semantic relations between the words, which in some implementations may be codified in a lexical database accessible to text corrector 123. As another example, text corrector 123 may be configured to perform longest common sub-string detection on the text data and the noisy text to recognize potential errors in the extracted text data for correction and/or for matching the noisy text to a string of the text data. Performing text correction may improve the accuracy of the match between text strings and bounded regions, the accuracy of the extracted text, or both.

Feature extractor 124 may be configured to extract features from the matched text data to generate multiple feature vectors. Each feature vector (or each set of feature vectors) may correspond to a bounded region and associated text block. In some implementations, each feature vector represents one bounding box and the associated text block. For example, a first feature vector may include an embedding that represents a first portion (e.g., a first text string) of the matched text data that is enclosed in a first bounded region, a statistical summary based on the first portion of the matched text data, and information associated with a graphical structure of the first bounded region. Other feature vectors may include similar information and representations of the other bounded regions.

In some implementations, the extracted features include text features, graphic features, pixel features, size features, other features, or a combination thereof. For example, the text features may include a count of characters in the text block, a count of words in the text block, a count of sentences in the text block, particular words or phrases that are included in the text block, bullets or other special characters that are included in the text block, n-grams that are included in the text block, models (such as arrays of numbers) that represent words in the text block or sentences in the text block, other text features, or a combination thereof. The graphic features may include a size of the bounded region, a count of pixels included in the bounded region, a shape of the bounded region (such as rectangular, square, circular, ellipsoid, polygon, etc.), other graphic features related to the bounded region, or a combination thereof. The pixel features may include colors of pixels included in the bounded region, intensity of pixels included in the bounded region, other pixel features, or a combination thereof. The size features may include a size of the bounded region, a percentage that the bounded region occupies of the total page area of the document, a ratio of the size of the bounded region to sizes of nearby bounded regions, other size features, or a combination thereof.

The feature vectors may be provided to ML classifier 125. ML classifier 125 may be a ML model, such as a trained ML classifier, that is configured to generate labels associated with the bounded regions based on the feature vectors. The labels may indicate levels of corresponding bounded regions (and the associated text blocks) within a document hierarchy associated with the document. For example, ML classifier 125 may receive a feature vector as an input and may classify the feature vector (and the associated bounded region and text block) as corresponding to a particular label of a group of labels for which ML classifier 125 has been trained. Each of the labels indicates a different level of a document hierarchy. In some implementations, the labels indicate whether the feature vectors (and the associated bounded regions and text blocks) are headers, section titles, subsection titles, or paragraphs. Other labels may indicate chapters, parties, clauses, sub-clauses, addendums, motions, votes, description, procedure, results, or any other type of label as needed by the particular use case. The labels may be selected during a training process of ML classifier 125. For example, training data including labeled feature vectors may be provided to ML classifier 125 to train ML classifier 125, as further described with reference to FIG. 2. In this manner, ML classifier 125 may be trained to generate labels corresponding to a desired document hierarchy, such as a hierarchy for a contract, a legal document, a governance document, a news document, a scientific research document, or any other type of document that has a hierarchical structure.

In some implementations, ML classifier 125 is included in or implemented by server 110. For example, after training, ML classifier 125 may be stored at and executed by server 110. In some other implementations, ML classifier 125 may be located externally to server 110. In such implementations, the feature vectors may be provided, such as via network 180, to an external device that executes ML classifier 125, and server 110 may receive the labels from the external device, such as via network 180. Locating ML classifier 125 externally to server 110 may reduce a memory footprint, processing resource usage, and/or power consumption at server 110.

Output generator 126 may be configured to output metadata indicating a hierarchical layout associated with the document based on the labels and the matched text data. For example, the metadata may indicate a level within the hierarchical layout of each text block, an order of each text block, a location of each text block (based on location information of the bounded regions), relationships between the different text blocks, field types associated with one or more of the text blocks, other information, or a combination thereof. The metadata may be stored at memory 112 (such as in database 113), may be outputted to another device for processing, or may be further processed by processor 111, as further described with reference to FIG. 2. In some implementations, output generator 126 may also be configured to output a representation of the hierarchical layout based on the metadata and the text data. For example, the hierarchical layout may be a table of contents, and the representation may be a linked table of contents that indicates various headings, sections, and sub-sections with user-selectable links that cause a document viewer application to present the document at the selected location. The representation may be stored, may be output to a display device, or may be output to another device, such as user terminal 160, as non-limiting examples.

The database 113 may be coupled to OCR engine 120, bounded region detector 121, text matcher 122, feature extractor 124, ML classifier 125, output generator 126, or a combination thereof. In some implementations, database 113 is configured to store detected text, one or more feature vectors, one or more labels, metadata indicating one or more hierarchical layouts, training data, processed document data, one or more predetermined boundary rule sets, or a combination thereof.

Figure 2:
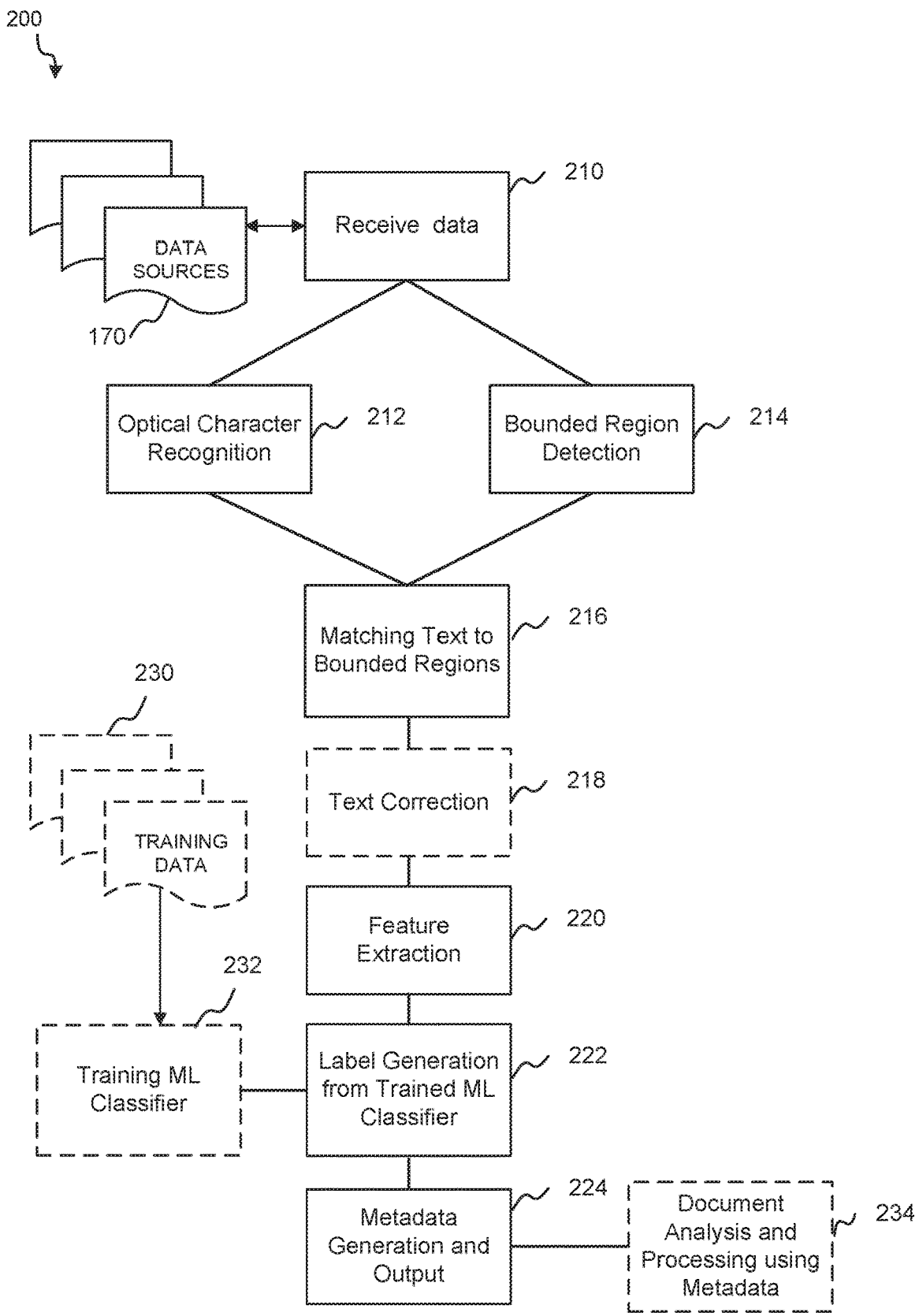
FIG. 2 shows a flow diagram illustrating functionality of the system of FIG. 1 implemented in accordance with aspects of the present disclosure.

The functionality of server 110 will now be discussed with respect to the block flow diagram illustrated in FIG. 2. FIG. 2 shows a flow diagram illustrating functionality of system 100 for determining a hierarchical layout of a document. Blocks of method 200 illustrated in FIG. 2 may be performed by one or more components of system 100 of FIG. 1. For example, block 210 may be performed by OCR engine 120 and bounded region detector 121, block 212 may be performed by OCR engine 120, block 214 may be performed by bounded region detector 121, blocks 216 (and 218) may be performed by text matcher 122 (and text corrector 123), block 220 may be performed by feature extractor 124, block 222 may be performed by ML classifier 125, and block 224 may be performed by output generator 126.

At block 210, data is received (e.g., at a receiver). For example, the data may include or correspond to a document (or multiple documents) and may be received from data sources 170. As described above, the data does not include metadata, or any other information, that indicates a predefined document structure associated with the document. The data corresponding to the document may be image data, such as a pdf file or an image file, or another type of data, such as a word processing document. The data may be generated by scanning a print document using a scanner, a camera, or another image capturing means, or the document may be electronically created (e.g., such as by a user operating a document creation and/or management application).

At block 212, optical character recognition (OCR) is performed on the data. Performing OCR may extract text data from the document by recognizing characters, words, sentences, punctuation marks, other characters, or a combination thereof, from the document. In some implementations, performing the OCR may include performing one or more preprocessing operations, one or more post-processing operations, or a combination thereof, to improve the accuracy of the extracted text data. In some implementations, performing OCR retains formatting of the text, such as bold, italics, text size, etc. In some other implementations, performing OCR eliminates the formatting of the text.

At block 214, bounded region detection is performed. For example, image processing and/or computer vision may be used to detect bounded regions in the document. Each bounded region encloses a corresponding block of text, such as a word, a few words, a sentence, a paragraph, multiple paragraphs, or other groupings of text. The bounded regions may have one or more shapes, such as rectangular, square, circular, elliptical, polygonal, or other shapes. In some implementations, detecting the bounded regions generate bounded region data, such as a JavaScript Object Notation (JSON) file indicating sets of coordinates and noisy text corresponding to the bounded regions.

The bounded regions may be detected based on a predetermined boundary rule set. The predetermined boundary rule set may include one or more rules for detecting regions in a document. For example, the predetermined boundary rule set may include a rule indicating that a first line of text and a second line of text are to be included in the same bounded region if a distance (e.g., a vertical distance) between a bottom-most pixel of the first line of text and an upper-most pixel of the second line of text is less than a first threshold, a rule indicating that the first line of text and the second line of text are to be included in different bounded regions if the distance satisfies (e.g., is greater than or equal to) a second threshold, a rule indicating that a first text block is to be included in a different bounded region than a second text block based on a distance between a left-most pixel of the first text block and a left-most pixel of the second text block satisfying a threshold, a rule indicating that the first text block is to be included in a different bounded region than the second text block based on a location of the left-most pixel of the first text block being within a first range and a location of the left-most pixel of the second text block being within a second range, a rule indicating that a first line of text and a second line of text are to be included in the same bounded region based on a similarity of a pixel characteristic of the first line of text, such as a color, an intensity, a resolution, or another characteristic, to a pixel characteristic of the second line of text satisfies a threshold, a rule indicating that one or more shapes, such as rectangles and squares, are acceptable for bounded regions, a rule indicating that one or more other shapes, such as ellipses or circles, are not acceptable for bounded regions, other rules, or a combination thereof. The predetermined boundary rule set may include any rule that enables boundary region detection using image processing and/or computer vision that would otherwise not be possible without metadata indicating bounded regions, user-input indicating bounded regions, or more resource-intensive computer vision techniques.

In some implementations, as shown in FIG. 2, block 212 and block 214 may be performed at least partially concurrently. For example, performance of the OCR may overlap in time with some or all of performance of the bounded region detection. In other implementations, block 212 and block 214 may be performed serially, with either block 212 or block 214 being performed first.

At block 216, text is matched to the detected bounded regions. For example, a string or sub-string of the text data may be matched to a bounded region, and the association between the text string and the bounded region indicates that the text string represents the text block enclosed by the bounded region in the document. In some implementations, low-level image-to-text conversion may be applied to the document to identify "noisy" text enclosed by the bounded region, and the noisy text may be matched to a text string of the text data generated from performing the OCR. In some such implementations, matching the text strings to the bounded regions may include, for a first bounded region, identifying a first block of noisy text enclosed within the first bounded region and selecting a first portion of the text data (e.g., a first text string) based on a similarity of the first block of noisy text to the first portion of the text data satisfying a threshold. For example, if a similarity score based on a comparison of the noisy text and the text string satisfies a threshold, the text string may be identified as a match and may be associated with the bounded region in matched text data. In some implementations, the matched text data may include or correspond to a modified version of the JSON file generated by the bounded region detection that is modified to associate a corresponding text string (instead of noisy text or no text) with each bounded region.

At block 218, text correction is optionally performed. The text correction may improve the accuracy of the text matched with the bounded region and/or improve matching of text strings to bounded regions. The text correction may include semantic matching and/or longest common sub-string detection, as non-limiting examples.

At block 220, feature extraction is performed based on the matched text data. For example, one or more features may be extracted from the matched text data (e.g., the data indicating the location, shape, and size of the bounded regions and the text strings enclosed by the bounded regions). The features may include text features, graphic features, pixel features, size features, other features, or a combination thereof, such as a count of characters in the text string, a count of words in the text string, a count of sentences in the text string, particular words or phrases that are included in the text string, bullets or other special characters that are included in the text string, n-grams that are included in the text string, models (such as arrays of numbers) that represent words or sentences in the text string, a size of the bounded region, a count of pixels included in the bounded region, a shape of the bounded region, colors of pixels included in the bounded region, intensity of pixels included in the bounded region, a percentage that the bounded region occupies of the total page area of the document, and/or a ratio of the size of the bounded region to sizes of nearby bounded regions, as non-limiting examples. The extracted features may be used to generate feature vectors for each of the bounded regions (and associated text strings). In some implementations, each feature vector includes an embedding that represents the text string that is enclosed in the bounded region, a statistical summary based on the text string, and information associated with a graphical structure of the bounded region.

At block 222, the feature vectors are provided to a ML classier that has been trained to output labels based on feature vectors received as inputs. The labels indicate levels of a document hierarchy that correspond to the bounded regions and associated text strings from which the feature vectors were generated. As a non-limiting example, the ML classifier may be trained to output labels indicating levels of a legal document hierarchy, such as header, section title, sub-section title, and paragraphs. In other implementations, the ML classifier may be trained for other document hierarchies having other labels, such as contracts, governance documents, news documents, or scientific research documents, as non-limiting examples. A label output by the ML classifier for a particular bounded region may indicate that the particular bounded region and corresponding text string are most likely part of a particular level of the document hierarchy. For example, the ML classifier may determine that an input feature vector associated with the particular bounded region is most similar to one or more feature vectors labeled with the particular label in a training data set based on a similarity score, a weighted similarity score, or one or more other comparisons or determinations performed by the ML classifier. Such determinations may be encoded within the ML classifier, such as using weights of connectors between nodes of a neural network-based classifier, as a non-limiting example.

At block 224, metadata is generated based on the labels and the matched text data. The metadata may indicate a hierarchical layout of the document. For example, the metadata may associate each bounded region and corresponding text string with a corresponding level of the hierarchical layout, may indicate a sequential ordering of the bounded regions and corresponding text strings, may indicate a relationship between one or more text strings, may identify one or more fields included in the text strings, or a combination thereof. The metadata may be used for generating a representation of the hierarchical layout, which may be output to an electronic device for display to a user, the metadata may be stored in a memory, the metadata may be provided to another device, or the metadata may be used for additional processing, as further described herein.

In some implementations, method 200 also enables training of the ML classifier. To illustrate, at block 232, training the ML classifier may be performed. The ML classifier may be trained using training data 230. Training data 230 may include training data generated based on user input from one or more human operators. The user input may indicate labels of one or more sections of one or more documents. For example, one or more users may label sections of one or more digital documents (e.g., scanned documents or electronically-generated documents), and a system may use the labels to generate labeled feature vectors for each section, which may be included in training data 230. Additionally, or alternatively, training data 230 may include training metadata received from a document processing application. The training metadata may indicate hierarchical layouts of one or more documents. For example, a document processing application may generate metadata that indicates information about a hierarchical layout of the generated document, such as identifiers of fields, sections, locations, data types, etc., associated with the document. The metadata (or labeled feature vectors generated based at least in part on the metadata) may be included in training data 230 for training the ML classifier.

The ML classifier may be trained for a particular type of document having a hierarchical layout. For example, the ML classifier may be trained for legal documents, and the labels used to train the ML classifier may include header, section title, sub-section title, and paragraphs. As another example, the ML classifier may be trained for contracts, and the labels may include header, section title, parties, clauses, paragraphs, signatures, addendum, and the like. As another example, the ML classifier may be trained for governance documents, and the labels may include header, section title, subsection title, paragraphs, votes, resolutions, motions, and the like. As another example, the ML classifier may be trained for news documents, and the labels may include title, byline, paragraphs, caption, pull-out quote, table, and the like. As another example, the ML classifier may be trained for scientific research documents, and the labels may include introduction, procedure, results, conclusion, and the like.

In some implementations, method 200 may enable performance of enhanced document features. To illustrate, at block 234, document analysis and processing using the metadata may be performed. The analysis and processing may enable features that would not be possible without knowledge of the hierarchical layout of the document. As an example, server 110 may identify a particular field in the document based on the metadata and the matched text data. For example, the metadata may indicate a field name of a text string included in a particular bounded region. The field name may be used to return a query or to display a particular page of the document, as non-limiting examples. As another example, server 110 may link the document to one or more other documents in a database, such as data sources 170, based on the particular field matching one or more corresponding fields in the one or more other documents. To illustrate, if the document is a contract, and the particular field is a name of a party, the document may be linked to other documents (e.g., contracts) that include the same name as a party. Such document linking may reduce time spent by a user in determining whether documents are related and/or enable multi-document analysis and processing. Although particular document analysis and processing features have been described, other document analysis and processing features based on a hierarchical layout of a document are also possible. Although the analysis and processing is described as being performed by server 110, in some other implementations, the metadata generated by server 110 may be provided to another device that performs the above-described analysis and processing.

As described with reference to FIG. 1, system 100 (e.g., server 110) and its corresponding operations and functions provide the ability to determine a hierarchical layout from a document that does not include metadata or other information that indicates a predefined document structure. For example, text extracted from a document may be subdivided and matched to bounded regions in the document. Use of a predetermined boundary rule set to detect the bounded regions may enable detection of bounded regions without user input using image processing and computer vision. The matched text data may be used to generate feature vectors provided to a trained ML classifier for determination of labels indicating levels within the hierarchical layout. Thus, a hierarchical layout may be determined for a document that is represented only by image data. Accordingly, the techniques of the present disclosure may be implemented to determine hierarchical layouts, such as tables of contents, for print documents that are scanned in to a computer or that are generated without metadata by a document generation or management application.

FIG. 3 depicts an example of a document and a hierarchical layout corresponding to the document determined in accordance with aspects of the present disclosure. FIG. 3 includes a document 300 and marked-up version 310 of the document that indicates a hierarchical layout associated with the document. Document 300 may include one or more pages, such as an illustrative page depicted in FIG. 3. In the implementation shown in FIG. 3, document 300 is a contract, although in other implementations, document 300 may be a different type of document, such as a legal document, a governance document, a news document, or a scientific research document, as non-limiting examples.

During processing of document 300, such as by system 100 (e.g., server 110) of FIG. 1, in accordance with the operations described with reference to FIG. 2, bounded regions may be detected in document 300. For example, bounded regions may be represented by the bounding boxes (e.g., rectangles) in marked-up version 310. Although depicted as rectangular, in some other implementations, the bounded regions may have other shapes, such as squares, circles, ellipses, polygons, or other shapes. The bounded regions may be detected based on a predetermined boundary rule set, which may include rules indicating distances between bounded regions, rules for detecting bounded regions based on location within the page, rules for detecting bounded regions based on formatting of the text included in the bounded regions, other rules, or a combination thereof.

The bounded regions may correspond to one or more levels within the hierarchical layout. For example, some bounded regions may be labeled "Section," for example based on the size of the bounded regions being relatively small, the location of the bounded regions (e.g., along a left side of the document), the text within the bounded regions being bold formatted, and/or other characteristics. Additionally, one bounded region may be labeled "Sub-Section," for example based on the size of the bounded region being relatively small, the location of the bounded region (e.g., indented from the left side of the document), the text within the bounded region being bold formatted, the bounded region being subsequent to a bounded region labeled "Section," and/or other characteristics. Additionally, some bounded regions may be labeled "Paragraph," for example based on the size of the bounded regions being relatively large, the location of the bounded regions (e.g., indented from the left side of the document), the text within the bounded regions having no special formatting, the bounded regions following bounded regions labeled "Section" or "Sub-Section," and/or other characteristics. Because the labels may be determined for the bounded regions (e.g., by system 100), the hierarchical layout, such as a table of contents or other document structure, may be determined and displayed to a user and/or metadata indicating the hierarchical layout may be used for additional document analysis and processing.

Figure 4:
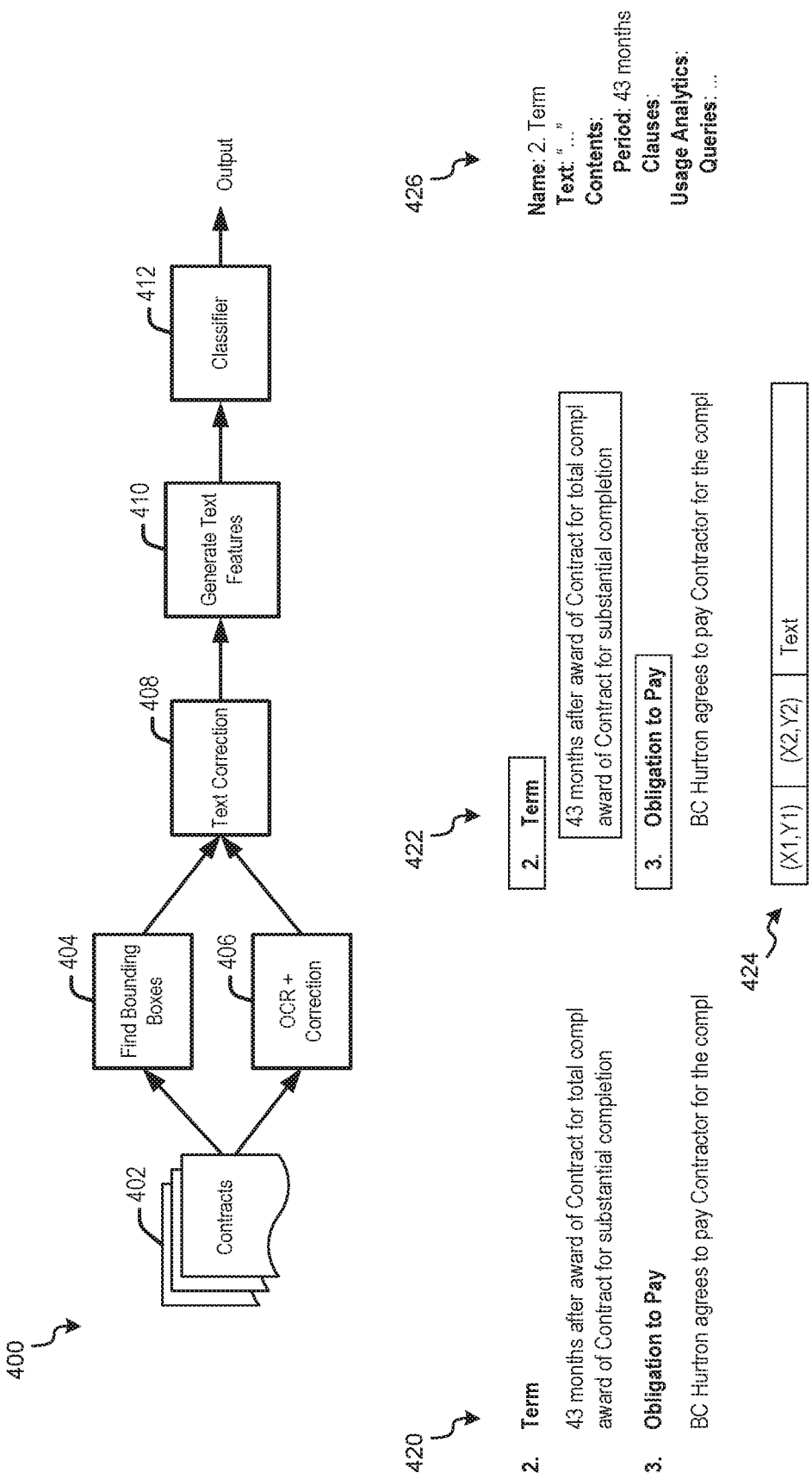
FIG. 4 is a block diagram of a system configured to generate a table of contents of a document.

FIG. 4 shows an example system 400 in accordance with the present disclosure. System 400 includes components or elements configured to receive contracts 402, to find bounding boxes 404, to perform OCR 406, to perform text correction 408, to generate (e.g., extract) text features 410, and classifier 412. Although referred to as contracts 402, in other implementations, system 400 may be configured to receive other types of documents, such as legal documents, governance documents, news documents, scientific research documents, or other types of documents.

System 400 may be configured to determine a document hierarchy by extracting a table of contents, or other document structure, from a PDF file of a digital document. Although described with reference to a PDF document, system 400 may process other types of digital documents as well as in-print documents after being scanned. In a particular implementation, system 400 ingests (e.g., consumes) a PDF file and generates a semi-structured data object that represents the document structure. In some such implementations, the output is represented by a JSON object, although other data formats may be used.

System 400 may receive a digital document, which in some implementations is a contract, as represented by contracts 402. FIG. 4 depicts an example of a contract at reference number 420. Although described with reference to contracts, in other implementations, system 400 may be configured to determine document hierarchies for other types of documents, such as legal documents, governance documents, news documents, or scientific research documents, as non-limiting examples.

To perform OCR 406, system 400 may implement or have access to an OCR service. In some implementations, the OCR service may be an off the shelf third party OCR service or a proprietary OCR service. The OCR service may process the input digital document (e.g., one of contracts 402) and extract the text from the document. The output of the OCR service is a text file that includes all the text in the document. In some implementations, the output of the OCR service does not retain text formatting, such as bold or italic formats. In some other implementations, the output of the OCR service may retain at least some text formatting. In some implementations, the OCR service may be configured to use domain language models to identify and correct the OCR output for some domain specific documents, such as legal documents, science documents, and tax documents, as non-limiting examples.

The component used to find bounding boxes 404 may be configured to extract a physical layout of the document. For example, the received PDF (or other digital document) may be decomposed into bounding boxes with each bounding box enclosing a block of text. FIG. 4 depicts an example of a contract with detected bounding boxes at reference number 422. Although described as bounding boxes, in other implementations, bounded regions having other shapes may be detected. In some implementations, finding bounding boxes 404 may be performed by a software application configured to find bounding boxes in a PDF file and to output a JSON file including bounding box data. Each bounding box may be represented as a set of coordinates on the physical page of the document as well as the text enclosed by the bounding box. An example of a representation of a bounding box is depicted in FIG. 4 at reference number 424. The bounding boxes may be used to identify the text location in the document, and other potential graphical features of the text. However, the text associated with each bounding box (as determined by this component) may be inaccurate (also referred to as "noisy" text). For example, the text associated with each bounding box may be less accurate than the text file output by the OCR service.

To perform text correction 408, the text extracted using the OCR is matched with the bounding boxes. For example, performing text correction 408 may use noisy text associated with each bounding box as well as metadata associated with each bounding box. The main goal of performing text correction 408 is to use each bounding box's noisy text to find the closest sub-string extracted by the OCR. In some implementations, performing text correction 408 may also include performing semantic matching, performing longest common sub-string matching, or both.

To generate text features 410, a feature extraction component extracts features from each bounding box and the corresponding text enclosed within. The features may include text features, graphical features, other types of features, or a combination thereof. The feature extraction component may process each bounding box and construct a single feature vector that represents the bounding box. This feature vector may include an embedding that represents the text in a bounding box, a statistical summary for the text, and information about the graphical structure of the bounding box itself.

After the feature vectors are generated, the feature vectors are provided to classifier 412. Classifier 412 may be any type of ML classifier, such as a neural network-based classifier or other type of ML classification model or module. Classifier 412 may be configured to classify each bounding box (represented by a corresponding feature vector) within a document hierarchy and output a label corresponding to each bounding box. The labels may indicate different levels of the document hierarchy, such as header, section, sub-section, and paragraphs, as non-limiting examples.

In some implementations, metadata indicating the document hierarchy may be generated based on the labels, such as described with reference to FIG. 1. Additionally, or alternatively, the results of classifier 412 (e.g., the labels) may be combined with the text of the bounding boxes and then ordered to create an output that represents the document's table of contents (or other document structure). In some implementations, the table of contents may be represented by a JSON structure. FIG. 4 depicts an example of a table of contents (or other document structure) of a contract at reference number 428.

As described with reference to FIG. 4, system 400 implements a pipeline to extract a hierarchical document structure from a digital document. For example, system 400 combines text extracted using OCR with graphical features of bounding boxes and matches them together. System 400 then generates features to assist a ML classifier to determine if a piece of text is a header, a section title, a subsection, or a regular paragraph in the document. In this manner, a table of contents (or other document structure) may be extracted from a document that does not include metadata, or other information, indicating a predefined document structure.

Figure 5:
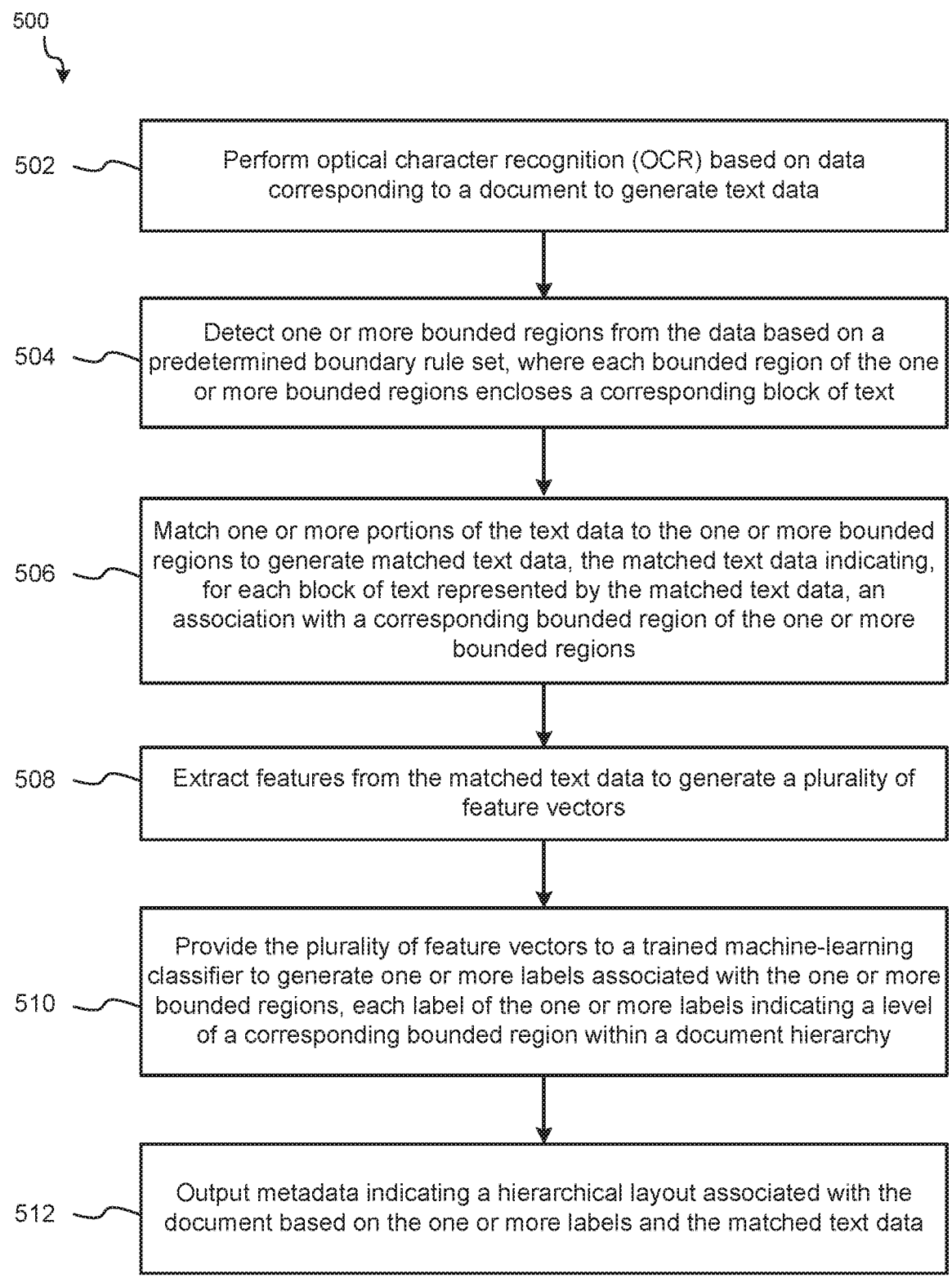
FIG. 5 shows is a flow chart of an example of a method of generating a hierarchical layout of a document.

FIG. 5 is a flow diagram of a method 500 of generating a hierarchical layout of a document. In some implementations, the method 500 may be performed by system 100 of FIG. 1, one or more components to execute operations of FIG. 2, or system 400 of FIG. 4.

Method 500 includes performing OCR based on data corresponding to a document to generate text data, at 502. For example, OCR engine 120 may perform OCR on data including or corresponding to a document to generate (e.g., extract) text data. Method 500 also includes detecting one or more bounded regions from the data based on a predetermined boundary rule set, at 504. Each bounded region of the one or more bounded regions encloses a corresponding block of text. For example, bounded region detector 121 may detect one or more bounded regions in the document based on a predetermined boundary rule set. In some implementations, the predetermined boundary rule set may include pixel distance rules, pixel location rules, pixel characteristic rules, region shape rules, or a combination thereof. For example, the predetermined boundary rule set may include rules indicating distances between different bounded regions, distances between text within the same bounded region, locations of different bounded regions, characteristics of text enclosed by different bounded regions, shapes of different bounded regions, sizes of different bounded regions, or a combination thereof, as non-limiting examples.

Method 500 includes matching one or more portions of the text data to the one or more bounded regions to generate matched text data, at 506. The matched text data indicates, for each block of text represented by the matched text data, an association with a corresponding bounded region of the one or more bounded regions. For example, text matcher 122 may match portions of the text data (e.g., text strings) to the bounded regions to generate matched text data that indicates information associated with each bounded region and the corresponding text string (e.g., text block). Method 500 also includes extracting features from the matched text data to generate a plurality of feature vectors, at 508. For example, feature extractor 124 may extract text features, graphical features, and/or other types of features from the matched text data to generate a plurality of feature vectors.

Method 500 includes providing the plurality of feature vectors to a trained machine-learning classifier to generate one or more labels associated with the one or more bounded regions, at 510. Each label of the one or more labels indicates a level of a corresponding bounded region within a document hierarchy. For example, the feature vectors may be provided to ML classifier 125, which may be trained to generate labels associated with the bounded regions and the corresponding text strings. The labels may indicate levels of a document hierarchy. Method 500 further includes outputting metadata indicating a hierarchical layout associated with the document based on the one or more labels and the matched text data, at 512. For example, output generator 126 may generate metadata that indicates a hierarchical layout associated with the document. The metadata may indicate levels associated with the bounded regions, ordering of the bounded regions, and/or other characteristics of the hierarchical layout.

In some implementations, the data does not include metadata indicating a predefined document structure associated with the document. For example, the data may include a pdf file of a scanned document or an electronically generated document that does not include metadata, or other information, indicating a predefined document structure associated with the document. Additionally, or alternatively, the hierarchical layout may include a table of contents associated with the document. For example, output generator 126 may output a table of contents, or other document structure, of the document.

In some implementations, matching the one or more portions of the text data to the one or more bounded regions includes, for a first bounded region of the one or more bounded regions, identifying a first block of noisy text enclosed within the first bounded region from the data and selecting a first portion of the text data as matching the first bounded region based on a similarity of the first block of noisy text to the first portion of the text data satisfying a threshold. For example, text matcher 122 may identify noisy text enclosed by the bounded regions, and may select text strings that match the bounded regions based on similarity scores of the noisy text to the text strings satisfying a threshold. Additionally, or alternatively, the method 500 may further include performing text correction on the matched text data. The text correction includes semantic matching, longest common sub-string detection, or a combination thereof. For example, text corrector 123 may perform text correction including semantic matching, longest common sub-string detection, or both, on the matched text data.

In some implementations, the method 500 also includes training the trained machine-learning classifier using training data generated based on a user input from a human operator. The user input may indicate user-generated labels of one or more sections of one or more documents. Additionally, or alternatively, the method 500 may also include training the trained machine-learning classifier based on training metadata received from a document processing application. The training metadata indicates hierarchical layouts of one or more documents. For example, ML classifier 125 may be trained using training data 230, as described with reference to block 232. Training data 230 may include (or be generated based on) training data generated based on a user input from a human operator, training metadata received from a document processing application, or both.

In some implementations, the method 500 also includes identifying a particular field in the document based on the matched text data and the metadata. In some such implementations, the method 500 further includes linking the document to one or more other documents in a database based on the particular field matching one or more corresponding fields in the one or more other documents. For example, document analysis and processing using the metadata may be performed, as described at block 234. The document analysis and processing may include identifying a particular field in the document, linking the document to one or more other documents in a database based on the particular field matching one or more corresponding fields in the one or more other documents, or both.

In some implementations, each bounded region of the one or more bounded regions is represented by a set of coordinates corresponding to one or more positions within one or more physical pages of the document. For example, if the bounded regions are defined by bounding boxes (e.g., rectangles), the bounded regions may be represented by coordinates of upper-left corners and coordinates of lower-right corners of the bounding boxes, as a non-limiting example.

In some implementations, a first feature vector of the plurality of feature vectors includes an embedding that represents a first portion of the matched text data that is enclosed in a first bounded region of the one or more bounded regions, a statistical summary based on the first portion of the matched text data, and information associated with a graphical structure of the first bounded region. Additionally, or alternatively, the one or more labels may indicate whether the one or more bounded regions are headers, section titles, subsection titles, or paragraphs. Additionally, or alternatively, the document may include a contract, a legal document, or a governance document.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-5 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for determining hierarchical layouts of documents from data, the method comprising:
    performing optical character recognition (OCR) based on data corresponding to a document to generate text data;
    detecting one or more bounded regions from the data based on a predetermined boundary rule set, the predetermined boundary rule set including region shape rules that indicate one or more acceptable boundary region shapes and one or more unacceptable boundary region shapes, wherein each bounded region of the one or more bounded regions encloses a corresponding block of text;
    matching one or more portions of the text data to the one or more bounded regions to generate matched text data, the matched text data indicating, for each block of text represented by the matched text data, an association with a corresponding bounded region of the one or more bounded regions;
    extracting features from the matched text data to generate a plurality of feature vectors;

providing the plurality of feature vectors to a trained machine-learning classifier to generate one or more labels associated with the one or more bounded regions, each label of the one or more labels indicating a level of a corresponding bounded region within a document hierarchy; and outputting metadata indicating a hierarchical layout associated with the document based on the one or more labels and the matched text data.

2. The method of claim 1, wherein the data does not include metadata indicating a predefined document structure associated with the document.

3. The method of claim 1, wherein the document comprises a single document, and wherein the hierarchical layout comprises a table of contents associated with the single document.

4. The method of claim 1, wherein the predetermined boundary rule set further includes pixel distance rules, pixel location rules, pixel characteristic rules, or a combination thereof.

5. The method of claim 1, wherein matching the one or more portions of the text data to the one or more bounded regions comprises, for a first bounded region of the one or more bounded regions:
identifying a first block of noisy text enclosed within the first bounded region from the data; and
selecting a first portion of the text data as matching the first bounded region based on a similarity of the first block of noisy text to the first portion of the text data satisfying a threshold.

6. The method of claim 1, further comprising performing text correction on the matched text data, the text correction comprising semantic matching, longest common sub-string detection, or a combination thereof.

7. The method of claim 1, further comprising training the trained machine-learning classifier using training data generated based on a user input from a human operator, the user input indicating user-generated labels of one or more sections of one or more documents.

8. The method of claim 1, further comprising training the trained machine-learning classifier based on training metadata received from a document processing application, the training metadata indicating hierarchical layouts of one or more documents.

9. The method of claim 1, wherein the document comprises a contract, and the method further comprising:
identifying a particular field in the document based on the matched text data and the metadata; and
linking the document to one or more other contracts in a database based on a value of the particular field matching the value of the particular field in the one or more other contracts, wherein the particular field comprises a party field, and wherein the value of the particular field comprises a name of a party to the contract.

10. The method of claim 1, wherein a first feature vector of the plurality of feature vectors includes one or more text features, one or more pixel features, one or more size features, and one or more graphic features, the one or more graphic features including a shape of a first bounded region.

11. A system comprising:
an optical character recognition (OCR) engine configured to perform OCR based on data corresponding to a document to generate text data;
a bounded region detector configured to detect one or more bounded regions from the data based on a predetermined boundary rule set, the predetermined boundary rule set including region shape rules that indicate one or more acceptable boundary region shapes and one or more unacceptable boundary region shapes, wherein each bounded region of the one or more bounded regions encloses a corresponding block of text;
a text matcher configured to match one or more portions of the text data to the one or more bounded regions to generate matched text data, the matched text data indicating, for each block of text represented by the matched text data, an association with a corresponding bounded region of the one or more bounded regions;
a feature extractor configured to extract features from the matched text data to generate a plurality of feature vectors;
a trained machine-learning classifier configured to generate one or more labels associated with the one or more bounded regions based on the plurality of feature vectors, each label of the one or more labels indicating a level of a corresponding bounded region within a document hierarchy; and
an output generator configured to output metadata indicating a hierarchical layout associated with the document based on the one or more labels and the matched text data.

12. The system of claim 11, further comprising:
a database coupled to the OCR engine, the bounded region detector, the text matcher, the feature extractor, the output generator, or a combination thereof.

13. The system of claim 12, wherein the database is configured to store the data, additional data corresponding to one or more other documents, the metadata, additional metadata indicating hierarchical layouts of at least one of the one or more other documents, or a combination thereof.

14. The system of claim 11, further comprising:
a processor; and
a memory storing instructions executable by the processor to cause the processor to perform one or more operations of the OCR engine, the bounded region detector, the text matcher, the feature extractor, the trained machine-learning classifier, the output generator, or a combination thereof.

15. The system of claim 11, further comprising:
an interface configured to enable communication with a data source that stores the data, an electronic device, or a combination thereof.

16. The system of claim 11, wherein each bounded region of the one or more bounded regions is represented by a set of coordinates corresponding to one or more positions within one or more physical pages of the document.

17. A computer-based tool including non-transitory computer readable media having stored thereon computer code which, when executed by a processor, causes a computing device to perform operations comprising:
performing optical character recognition (OCR) based on data corresponding to a document to generate text data;
detecting one or more bounded regions from the data based on a predetermined boundary rule set, the predetermined boundary rule set including region shape rules that indicate one or more acceptable boundary region shapes and one or more unacceptable boundary region shapes, wherein each bounded region of the one or more bounded regions encloses a corresponding block of text;
matching one or more portions of the text data to the one or more bounded regions to generate matched text data, the matched text data indicating, for each block of text represented by the matched text data, an association with a corresponding bounded region of the one or more bounded regions;

extracting features from the matched text data to generate a plurality of feature vectors;

providing the plurality of feature vectors to a trained machine-learning classifier to generate one or more labels associated with the one or more bounded regions, each label of the one or more labels indicating a level of a corresponding bounded region within a document hierarchy; and outputting metadata indicating a hierarchical layout associated with the document based on the one or more labels and the matched text data.

18. The computer-based tool of claim 17, wherein a first feature vector of the plurality of feature vectors includes a text string that is enclosed in a first bounded region of the one or more bounded regions and information associated with a graphical structure of the first bounded region, the information indicating a size and a shape of the first bounded region.

19. The computer-based tool of claim 17, wherein the one or more labels indicate whether the one or more bounded regions are headers, section titles, subsection titles, or paragraphs.

20. The computer-based tool of claim 17, wherein the document comprises a contract, a legal document, or a governance document, and wherein the block of text comprises multiple words.

\* \* \* \* \*